US007554437B2

(12) United States Patent
Axelsen

(10) Patent No.: US 7,554,437 B2
(45) Date of Patent: Jun. 30, 2009

(54) REAL-TIME ROOM OCCUPANCY MONITORING SYSTEM

(75) Inventor: Edward George Axelsen, Saratoga, CA (US)

(73) Assignee: Palm, Inc., Sunnyvale, CA (US)

( * ) Notice: Subject to any disclaimer, the term of this patent is extended or adjusted under 35 U.S.C. 154(b) by 386 days.

(21) Appl. No.: 11/536,845

(22) Filed: Sep. 29, 2006

(65) Prior Publication Data

US 2008/0079569 A1    Apr. 3, 2008

(51) Int. Cl.
*G08B 1/00* (2006.01)
(52) U.S. Cl. ............... 340/531; 340/524; 340/565; 340/567; 340/825.28; 705/5
(58) Field of Classification Search ............ 340/825.28, 340/565–567, 552–554, 531, 524–525, 506; 705/5, 8
See application file for complete search history.

(56) References Cited

U.S. PATENT DOCUMENTS

| 6,281,790 | B1 * | 8/2001 | Kimmel et al. | 340/524 |
| 6,614,450 | B1 * | 9/2003 | Vossler | 705/8 |
| 6,972,660 | B1 * | 12/2005 | Montgomery et al. | 340/5.52 |
| 2003/0097284 | A1 * | 5/2003 | Shinozaki | 705/5 |
| 2007/0162315 | A1 * | 7/2007 | Hodges | 705/8 |

OTHER PUBLICATIONS

Chan, C. et al. "Room Occupancy Detection with Power Line Positioning in a Wireless Sensor Network," Princeton University, May 15, 2007, [online] [Retrieved Mar. 26, 2008] Retrieved from the Internet<URL:http://www.princeton.edu/~ckctwo/cos479/plp_project_paper.pdf>.
Conner, W.S. et al. "Workplace Applications of Sensor Networks," Intel Research and Development and University of Southern California Information Science Institute, 2004, [online] [Retrieved Mar. 26, 2008] Retrieved from the Internet<URL:http://isi.edu/div7/publication_files/Conner04a.pdf>.

* cited by examiner

*Primary Examiner*—Thomas J Mullen
(74) *Attorney, Agent, or Firm*—Fenwick & West LLP

(57) ABSTRACT

A room occupancy monitoring system monitors the occupancy status of a plurality of rooms and collects and displays the room occupancy information in real time. The room occupancy monitoring system includes a plurality of room occupancy sensor devices and a server. Each of the room occupancy sensor devices is located in a corresponding one of a plurality of rooms, detects whether the corresponding one of the plurality of rooms is occupied, and generates a first signal indicating whether the corresponding one of the plurality of the rooms is occupied and a second signal indicative of the identity of the corresponding one of the rooms. The server receives the first signal and the second signal from the room occupancy sensor devices through a data communication network and displays room occupancy information of the plurality of the rooms based on the first signal and the second signal on a display device.

20 Claims, 5 Drawing Sheets

REAL-TIME ROOM OCCUPANCY MONITORING SYSTEM

BACKGROUND OF THE INVENTION

1. Field of the Invention

The present invention relates to a system and a method for monitoring actual room occupancy in real time and providing the room occupancy information for use in reserving and using rooms.

2. Description of the Related Art

Large organizations typically have a number of conference rooms for use by their employees for various business purposes. In order to manage the use of these conference rooms, most organizations use a rudimentary reservation system. Those who would like to use a conference room reserve a particular conference room for use at a certain time slot. Such reservations are typically made on a conventional on-line reservation system or sometimes "off-line" simply on a piece of paper.

Once the reservations are made, the conventional on-line or off-line reservation systems would show the reserved conference room to be in use during the reserved time slot regardless of whether the conference room is actually being used. Even if a meeting is canceled and the reserved conference room is not actually used during the reserved time slot, the conventional reservation systems would not be able to reflect the non-use of the reserved conference room during the reserved time slot unless those who reserved the conference room actually canceled the reservation. Therefore, those would like to have impromptu meetings may not be able to use that reserved conference room even though it is vacant.

Because the conventional reservation systems are not able to monitor the actual occupancy of conference rooms, they are particularly disadvantaged when the conference rooms are spread out over a large area. It becomes very cumbersome and time-consuming to manually monitor the actual occupancy of conference rooms dispersed over a large area.

Therefore, there is a need for a room occupancy monitoring system that can automatically monitor the actual occupancy of rooms in real time. There is also a need for a room occupancy monitoring system that can provide the actual room occupancy information available for use in a convenient manner.

SUMMARY OF THE INVENTION

Embodiments of the present invention include a system and a method for monitoring the occupancy status of a plurality of rooms, collecting the room occupancy information in real time, and displaying the room occupancy information in real time so that users may monitor the actual occupancy of the rooms.

In one embodiment, the room occupancy monitoring system includes a plurality of room occupancy sensor devices and a server communicatively coupled to the plurality of room occupancy sensor devices via a data communication network. Each of the room occupancy sensor devices is located in a corresponding one of a plurality of rooms, detects whether the corresponding one of the plurality of rooms is occupied, and generates a first signal indicating whether the corresponding one of the plurality of the rooms is occupied and a second signal indicative of the identity of the corresponding one of the rooms. The server receives the first signal and the second signal through the data communication network and displays room occupancy information of the plurality of the conference room based on the first signal and the second signal on a display device. The display device may be on a remote computing device that can communicate with the server.

In one embodiment, the room occupancy sensor device comprises a motion sensor module detecting whether the corresponding one of the plurality of rooms is occupied and generating the first signal indicative of whether the corresponding one of the plurality of rooms is occupied, and a network interface module coupled to the data communication network, the network interface module receiving the first signal from the motion sensor module and transmitting the first signal to the server via the communication network together with the second signal. The motion sensor module can be an infrared motion sensor, an ultrasonic motion sensor, a pressure sensor, or a beam of light sensor.

In another embodiment, the room occupancy sensor may further comprise a data conversion module coupled to the motion sensor device and the network interface module, the data conversion module receives the first signal from the motion sensor module in analog form and converting the first signal to digital form for transmission by the network interface module via the data communication network.

The second signal may be an IP (Internet Protocol) address assigned to the network interface module and corresponding to one of the plurality of conference rooms. The IP address can be dynamically assigned to the network interface module by the server or hard coded to the network interface module and be fixed.

In one embodiment, each of the room occupancy sensor devices transmits the first signal and the second signal to the server in real time after a change is detected in an occupancy status of the corresponding one of the plurality of rooms. In another embodiment, each of the room occupancy sensor devices transmits the first signal and the second signal to the server in response to receiving a ping signal or query from the server.

The present invention has the advantage that the users of the room occupancy monitoring system can monitor and determine whether a particular room is actually occupied or not in real time without having to manually check the rooms. The room occupancy monitoring system will reflect the actual occupancy status of the room rather than a mere schedule to occupy or not occupy the rooms. Also the occupancy status information can be made available for access from a remote computing device, making it even more convenient for users to determine the room occupancy status.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
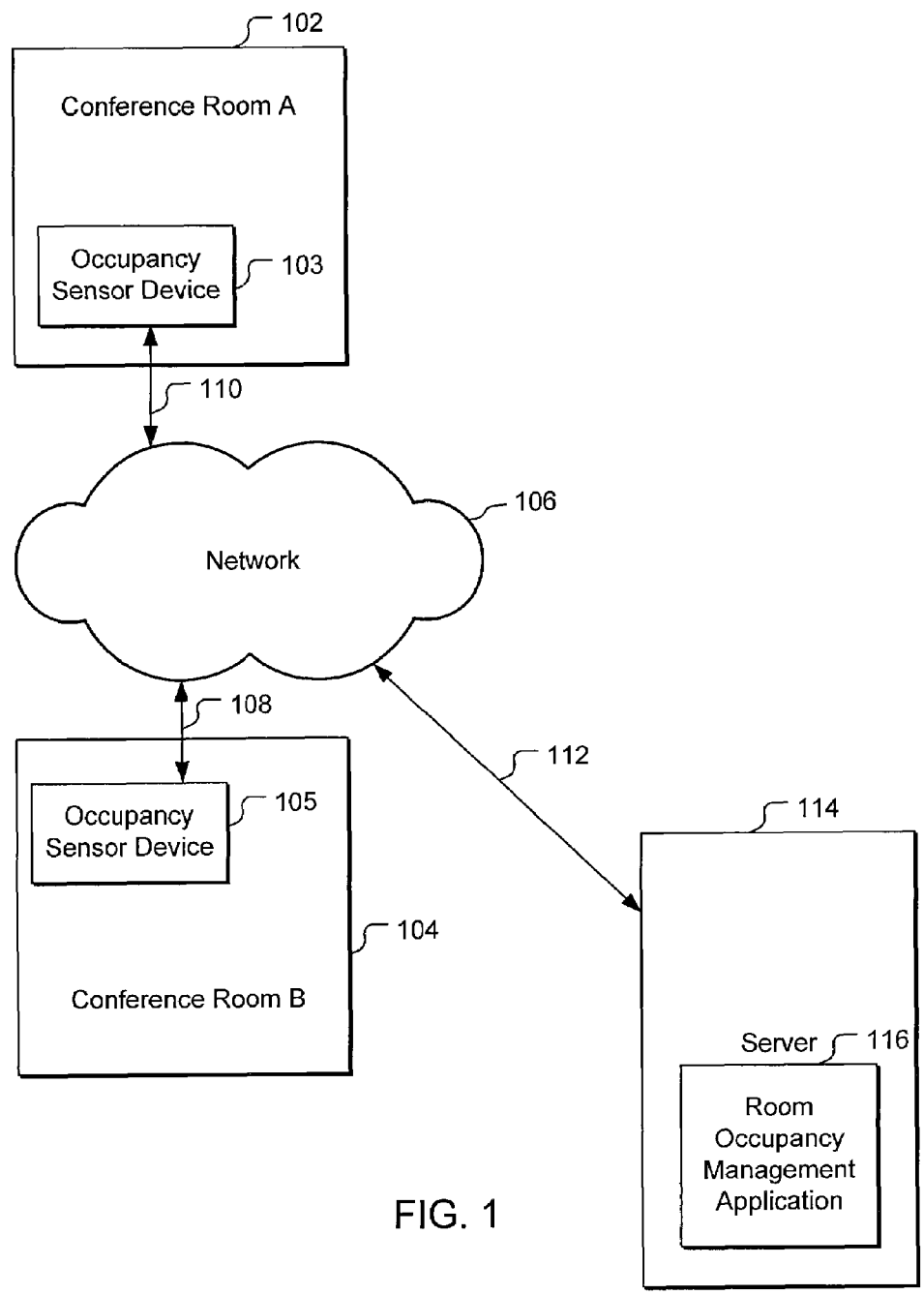
FIG. 1 illustrates the architecture of a room occupancy monitoring system, according to one embodiment of the present invention.

FIG. 1 illustrates the architecture of a room occupancy monitoring system, according to one embodiment of the present invention. The room occupancy monitoring system includes occupancy sensor devices 103, 105 each deployed in different conference rooms 102, 104 and a server 114 running a room occupancy management application 116. Although only two conference rooms 102, 104 are shown with two occupancy sensor devices 103, 105, note that there can be any number of conference rooms with one or more occupancy sensor devices deployed in each conference room. The occupancy sensor devices 103, 105 and the server 114 are coupled 110, 108, 112 to a data communication network 106 for communication with one another. The network 106 may be a LAN (local area network) such as the Ethernet, WAN (wide area network), or the Internet employing any type of wired or wireless communication protocol such as TCP/IP, WiFi (IEEE 802.11), Bluetooth, WiMax (IEEE 802.16d/e), etc. The network 106 includes any standard networking equipment such as routers for implementing the data communication network 106.

The occupancy sensor devices 103, 105 detect whether the conference rooms 102, 104 are actually occupied by detecting the motions, body heat, or pressure of the occupants, if any, and send the room occupancy information to the server 114 with the identification of the occupancy sensor devices 103, 105 corresponding to the conference rooms 102, 104. The occupancy sensors 103, 105 can be mounted at a location for easy detection of the motions of the occupants, for example, on the ceiling or on a wall or in a light-switch or in a chair of the conference rooms 102, 104. A more detailed description on the structure and functionality of the occupancy sensor devices 103, 105 follows below with reference to FIG. 2.

The server 114 receives the room occupancy information from the occupancy sensor devices 103, 105 together with the identification of the occupancy sensor devices 103,105 corresponding to the conference rooms 102, 104. Therefore, the room occupancy management application 116 running on the server 114 can recognize which occupancy sensor device 103, 105 associated with which conference room 102, 104 is reporting the occupancy or non-occupancy of the associated conference room 102, 104. The room occupancy management application 116 collects the received room occupancy information, and updates and displays the room occupancy status on a user interface, as will be described in more detail with reference to FIG. 4.

Figure 2:
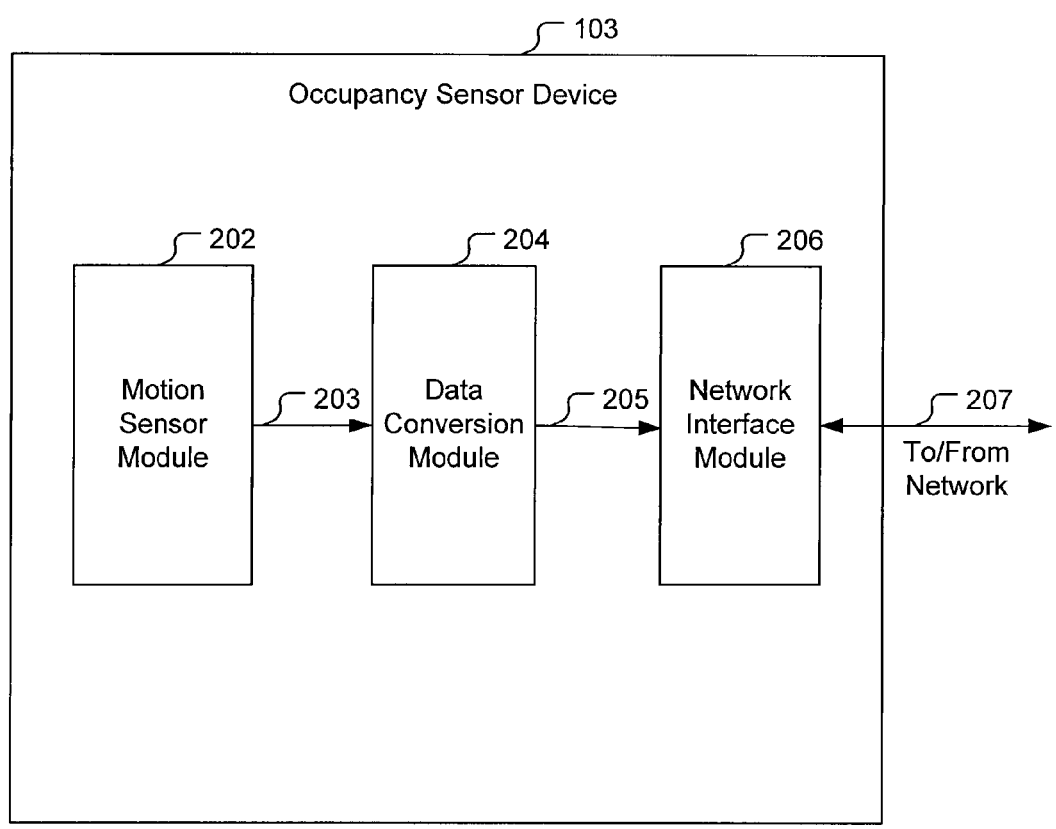
FIG. 2 illustrates the occupancy sensor device used in the room occupancy monitoring system, according to one embodiment of the present invention.

FIG. 2 illustrates the occupancy sensor device 103 used in the room occupancy monitoring system, according to one embodiment of the present invention. Although only the occupancy sensor device 103 is described herein, other occupancy sensor devices 105 may have similar structures. The occupancy sensor device 103 includes a motion sensor module 202, a data conversion module 204 coupled to the motion sensor module 202, and a network interface module 206 coupled to the data conversion module 204.

The motion sensor module 202 senses the motion of people present in the conference room 102 and generates a signal indicative of the existence (i.e., occupied) or non-existence (i.e., not occupied) of motion in the conference room 102. The motion sensor module 202 can be a conventional IR (infrared) motion sensor or an ultrasonic sensor. Although a motion sensor module 202 is described herein, a heat sensor or a pressure sensor can also be used to detect whether the conference room 102 is occupied.

For example, the motion sensor module 202 can be a passive IR motion sensor (also known as a pyroelectric sensor). In order to detect the presence of a human being in the rooms where the IR motion sensor is deployed, a passive IR motion sensor includes IR sensors that are sensitive to the temperature of a human body. Humans, having a skin temperature of about 93 degrees Fahrenheit, typically radiate infrared energy with a wavelength between 9 and 10 micrometers. Therefore, the IR sensors are typically made to be sensitive in the range of 8 to 12 micrometers of the IR wavelength. The infrared light bumps electrons off a substrate in the IR sensor, and these electrons are detected and amplified into a signal 203 indicative of the existence (i.e., occupied) or non-existence (i.e., not occupied) of motion in the conference rooms 102, 104.

For another example, the motion sensor module 202 can be an ultrasound motion sensor that senses motion by comparing the doppler shifted wave reflected by a moving object with the original wave created by the ultrasound motion sensor. Any frequency change is accompanied by a continuous phase change between the two waves, which is sensed and amplified into a signal 203 indicative of the existence (i.e., occupied) or non-existence (i.e., not occupied) of motion in the conference rooms 102, 104. Typically, the frequency of the emitted ultrasound wave is about 40 kHz.

The data conversion module 204 receives the signal 203 indicative of the existence (i.e., occupied) or non-existence (i.e., not occupied) of motion in the conference room 102. The signal 203 is typically (but not necessarily) an analog signal. The data conversion module 204 converts the signal 203 to digital data 205 that can be transmitted via a data communication network 106. For example, the digital data 205 may include "1s" indicating that the conference room is occupied and "0s" indicating that the conference room is not occupied. However, in other embodiments, the motion sensor module 202 itself is capable of generating the signal 203 in digital form and thus the data conversion module 204 would not be required in those other embodiments.

The network interface module 206 receives the digital data 205 and transmits the received digital data 205 to the server 114 through the data communication network 106. The network interface module 206 can be any type of conventional network interface complying with the communication protocol employed by the network 106. For example, the network interface module 206 may be an Ethernet interface or a WiFi interface.

The network interface module 206 also transmits information indicating its location or identity, such as an IP (Internet Protocol) address, to the server 114 together with the digital data 205. The IP address is indicative of the location or identity where the network interface module 206 is deployed. For example, the network interface module 206 may transmit "1s" with an IP address 1.2.3.4 that corresponds to conference room 102, indicating that conference room 102 is occupied. For another example, the network interface module 206 may transmit "0s" with an IP address 1.2.3.4 that corresponds to conference room 102, indicating that conference room 102 is not occupied. For still another example, a different IP address, e.g., IP address 5.6.7.8, may be assigned to indicate another conference room 104, in which case the network interface module of the occupancy sensor device 105 would transmit either "1s" or "0s" together with the IP address 5.6.7.8 to the server 114 to indicate that conference room 104 is occupied or non-occupied, respectively. The IP address of the network interface module 106 can be hard coded into the network interface module 206, or can be dynamically assigned to the network interface module 206 by the server 114.

Figure 3A:
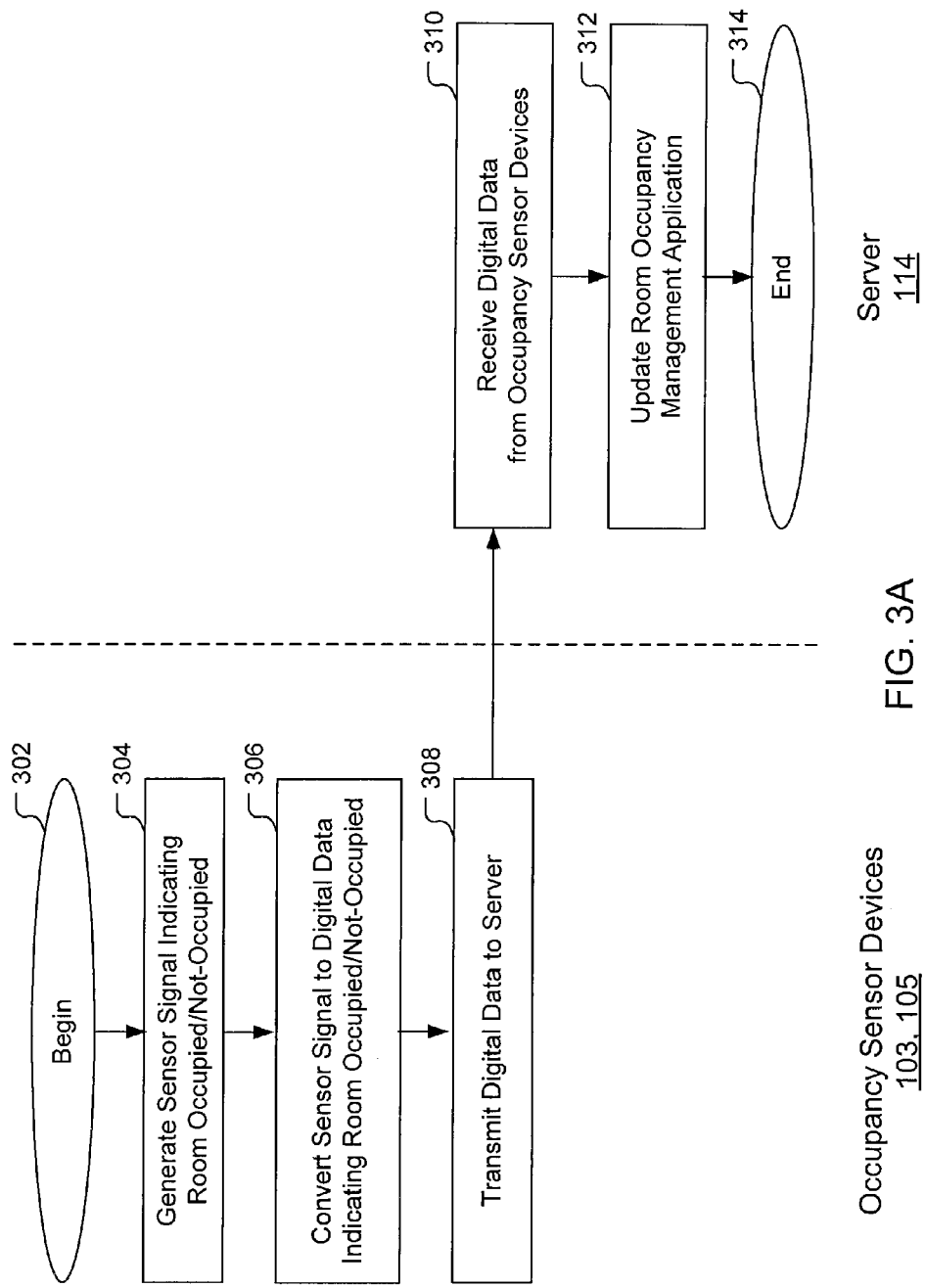
FIG. 3A illustrates a method of monitoring room occupancy and collecting room occupancy information, according to one embodiment of the present invention.

FIG. 3A illustrates a method of monitoring room occupancy and collecting the room occupancy information, according to one embodiment of the present invention. In the embodiment of FIG. 3A, the occupancy information is sent from the occupancy sensor devices 103, 105 to the server 114 without the intervention of the server 114.

Referring to FIG. 3A, as the process begins 302, the occupancy sensor devices 103, 105 generate 304 the sensor signals 203 indicating whether the conference rooms are occupied or not occupied, and converts 306 the sensor signal 203 to digital data 205 indicating whether the conference rooms are occupied or not occupied. The occupancy sensor devices 103, 105 then transmit 308 the digital data 205 to the server 114 in real time after a change in the occupancy status is detected. The server 114 receives 310 the digital data 205 from the occupancy sensor devices 103, 105, and updates 312 the room occupancy management application 116 with the received digital data 205 to reflect the most recent occupancy status of the conference rooms that are being monitored. Then the process ends 314.

Figure 3B:
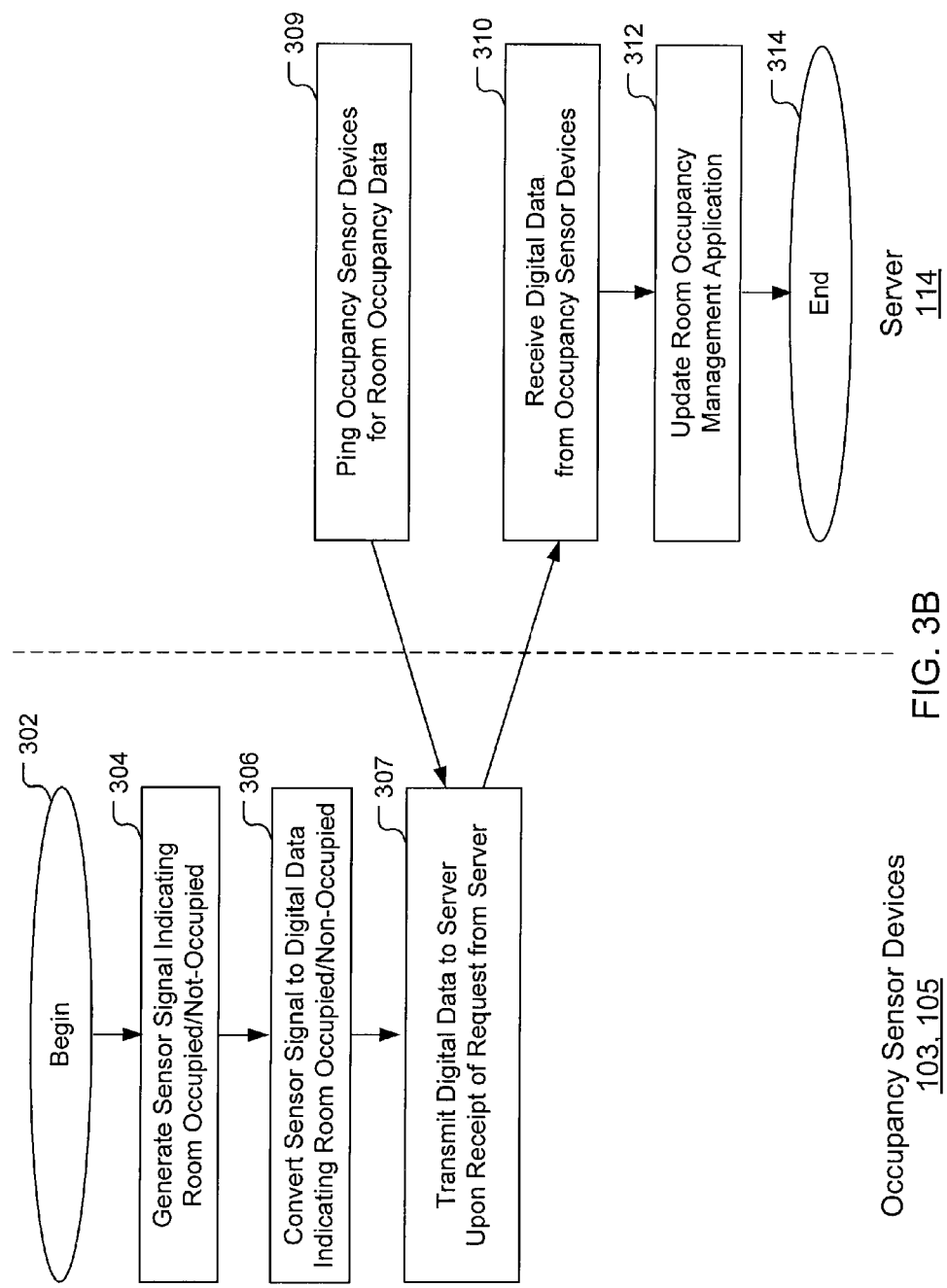
FIG. 3B illustrates a method of monitoring room occupancy and collecting room occupancy information, according to another embodiment of the present invention.

FIG. 3B illustrates a method of monitoring room occupancy and collecting the room occupancy information, according to another embodiment of the present invention. In the embodiment of FIG. 3B, the occupancy information is sent from the occupancy sensor devices 103, 105 to the server 114 when the server 114 pings or queries the occupancy sensor devices 103, 105 to request for the occupancy information. The steps of the embodiment of FIG. 3B are substantially same as the steps of the embodiment of FIG. 3A except for steps 307 and 309.

Referring to FIG. 3B, as the process begins 302, the occupancy sensor devices 103, 105 generate 304 the sensor signals 203 indicating whether the conference room is occupied or not occupied, and converts 306 the sensor signal 203 to digital data 205 indicating whether the conference rooms are occupied or not occupied. In response to the server 114 pinging 309 the occupancy sensor devices 103, 105 to request for the occupancy data, the occupancy sensor devices 103, 105 transmit 307 the digital data 205 to the server 114. The server 114 receives 310 the digital data 205 from the occupancy sensor devices 103, 105, and updates 312 the room occupancy management application 116 with the received digital data 205 to reflect the most recent occupancy status of the conference rooms that are being monitored. Then the process ends 314.

Figure 4:
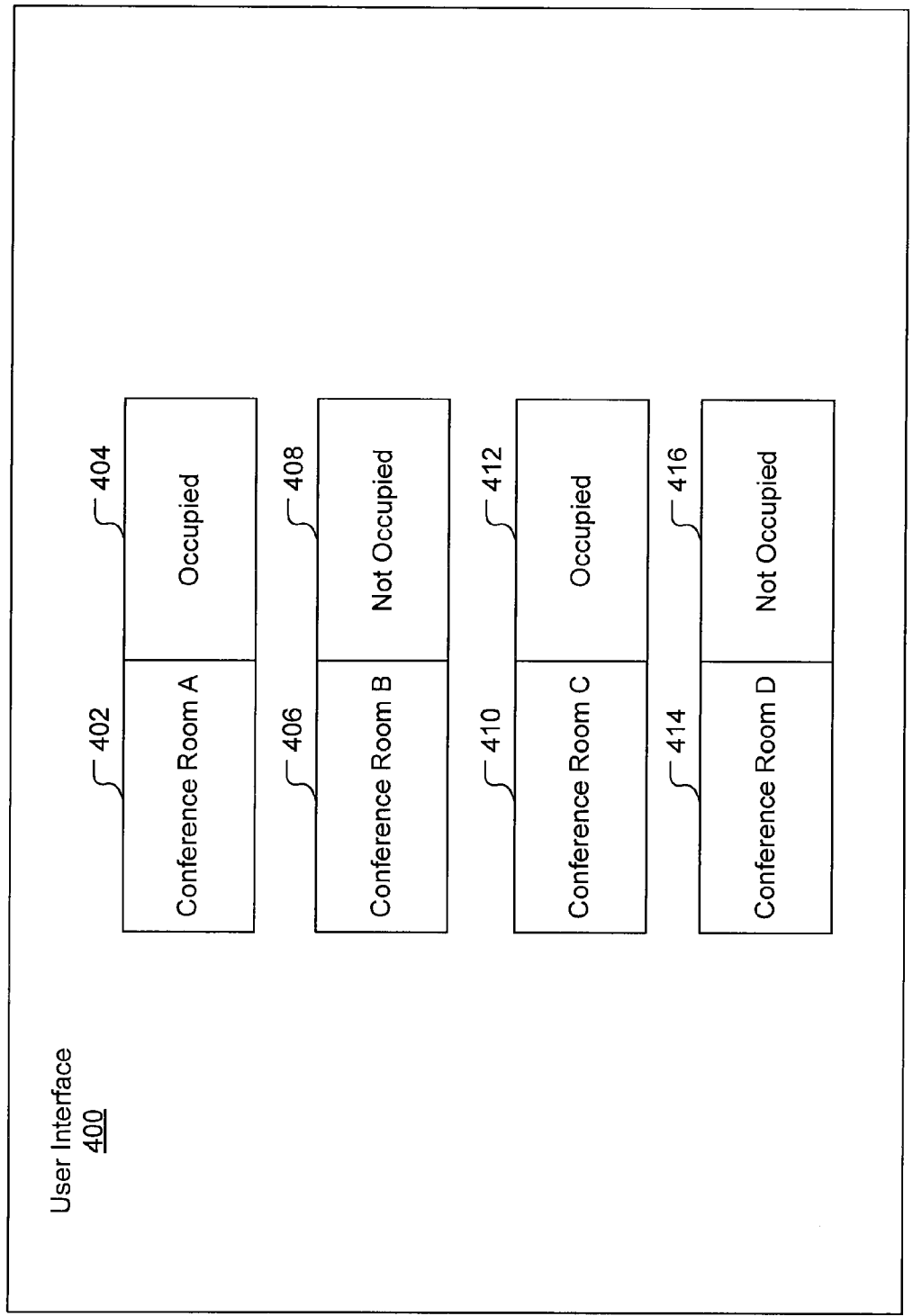
FIG. 4 illustrates a user interface for displaying room occupancy status, according to one embodiment of the present invention.

FIG. 4 illustrates a user interface 400 for displaying room occupancy status, according to one embodiment of the present invention. The user interface 400 is generated by the room occupancy management application 116 running on the server 114. However, the user interface 400 can be displayed on the server 114 or on any other remote computing device such as a computer, cellular phone device, smartphone, PDA (Personal Digital Assistant), etc. that is communicatively coupled to the server 114 through a wired or wireless network.

Referring to FIG. 4, each conference room 402, 406, 410, 414 is associated with a corresponding occupancy status (occupied or not occupied) 404, 408, 412, 416. The occupancy status 404, 408, 412, 416 can be updated in real time, because the occupancy sensor devices 103, 105 will detect any change in the occupancy status in real time and transmit the occupancy status information to the server 114. Therefore, the users of the room occupancy management application 116 can monitor and determine whether a particular conference room 402, 406, 410, 414 is actually occupied or not in real time without having to manually check the conference rooms 402, 406, 410, 414. The occupancy status of the conference rooms can be checked even from a remote computer or cellular phone device, smartphone, PDA, etc. that can communicate with the room occupancy management application 116 running on the server 114.

Upon reading this disclosure, those of ordinary skill in the art will appreciate still additional alternative structural and functional designs for a system and a process for room occupancy monitoring through the disclosed principles of the present invention. Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A room occupancy monitoring system, comprising:
   a plurality of room occupancy sensor devices, each of the room occupancy sensor devices located in a corresponding one of a plurality of rooms and detecting whether the corresponding one of the plurality of rooms is occupied and generating a first signal indicating whether the corresponding one of the plurality of the rooms is occupied and a second signal indicative of the identity of the corresponding one of the rooms; and
   a server communicatively coupled to the plurality of room occupancy sensor devices via a data communication network, the server receiving the first signal and the second signal through the data communication network and displaying room occupancy information of the plurality of rooms based on the first signal and the second signal on a display device.

2. The system of claim 1, wherein the room occupancy sensor device comprises:
   a motion sensor module detecting whether the corresponding one of the plurality of rooms is occupied and generating the first signal indicative of whether the corresponding one of the plurality of rooms is occupied; and a network interface module coupled to the data communication network, the network interface module receiving the first signal from the motion sensor module and transmitting the first signal to the server via the communication network together with the second signal.

3. The system of claim 2, wherein the room occupancy sensor further comprises:
a data conversion module coupled to the motion sensor module and the network interface module, the data conversion module receiving the first signal from the motion sensor module in analog form and converting the first signal to digital form for transmission by the network interface module via the data communication network.

4. The system of claim 2, wherein the motion sensor module is an infrared motion sensor or an ultrasonic motion sensor.

5. The system of claim 2, wherein the second signal is an IP (Internet Protocol) address assigned to the network interface module and corresponding to one of the plurality of rooms.

6. The system of claim 5, wherein the IP address is dynamically assigned to the network interface module by the server.

7. The system of claim 5, wherein the IP address is hard coded to the network interface module and is fixed.

8. The system of claim 1, wherein each of the room occupancy sensor devices transmits the first signal and the second signal to the server in real time after a change is detected in an occupancy status of the corresponding one of the plurality of rooms.

9. The system of claim 1, wherein each of the room occupancy sensor devices transmits the first signal and the second signal to the server in response to receiving a ping signal or a query signal from the server.

10. The system of claim 1, wherein the first signal is in a first state if the room is occupied and in a second state if the room is not occupied.

11. The system of claim 1, wherein the display device is on a remote computing device communicatively coupled to the server.

12. The system of claim 1, wherein the data communication network is a wireless data communication network.

13. A method of monitoring room occupancy, the method comprising:
detecting whether each of a plurality of rooms is occupied, using a plurality of room occupancy sensor devices each located in a corresponding one of the plurality of rooms and detecting whether the corresponding one of the plurality of rooms is occupied and generating a first signal indicating whether the corresponding one of the plurality of the rooms is occupied and a second signal indicative of the identity of the corresponding one of the rooms; and
transmitting the first signal and the second signal to a server via a data communication network; and
displaying room occupancy information of the plurality of the rooms based on the first signal and the second signal on a display device.

14. The method of claim 13, wherein the second signal is an IP (Internet Protocol) address assigned to a corresponding one of the room occupancy sensor devices and corresponding to one of the plurality of rooms.

15. The method of claim 14, wherein the IP address is dynamically assigned to the corresponding one of the room occupancy sensor devices by the server.

16. The method of claim 14, wherein the IP address is hard coded to the corresponding one of the room occupancy sensor devices and is fixed.

17. The method of claim 13, wherein the first signal and the second signal are transmitted to the server in real time after a change is detected in an occupancy status of the corresponding one of the plurality of rooms.

18. The method of claim 13, wherein the first signal and the second signal are transmitted to the server in response to a ping signal or a query signal received at the corresponding one of the room occupancy sensor devices from the server.

19. The method of claim 13, wherein the first signal is in a first state if the room is occupied and in a second state if the room is not occupied.

20. The method of claim 13, wherein the display device is on a remote computing device communicatively coupled to the server.

* * * * *